Patented Aug. 1, 1950

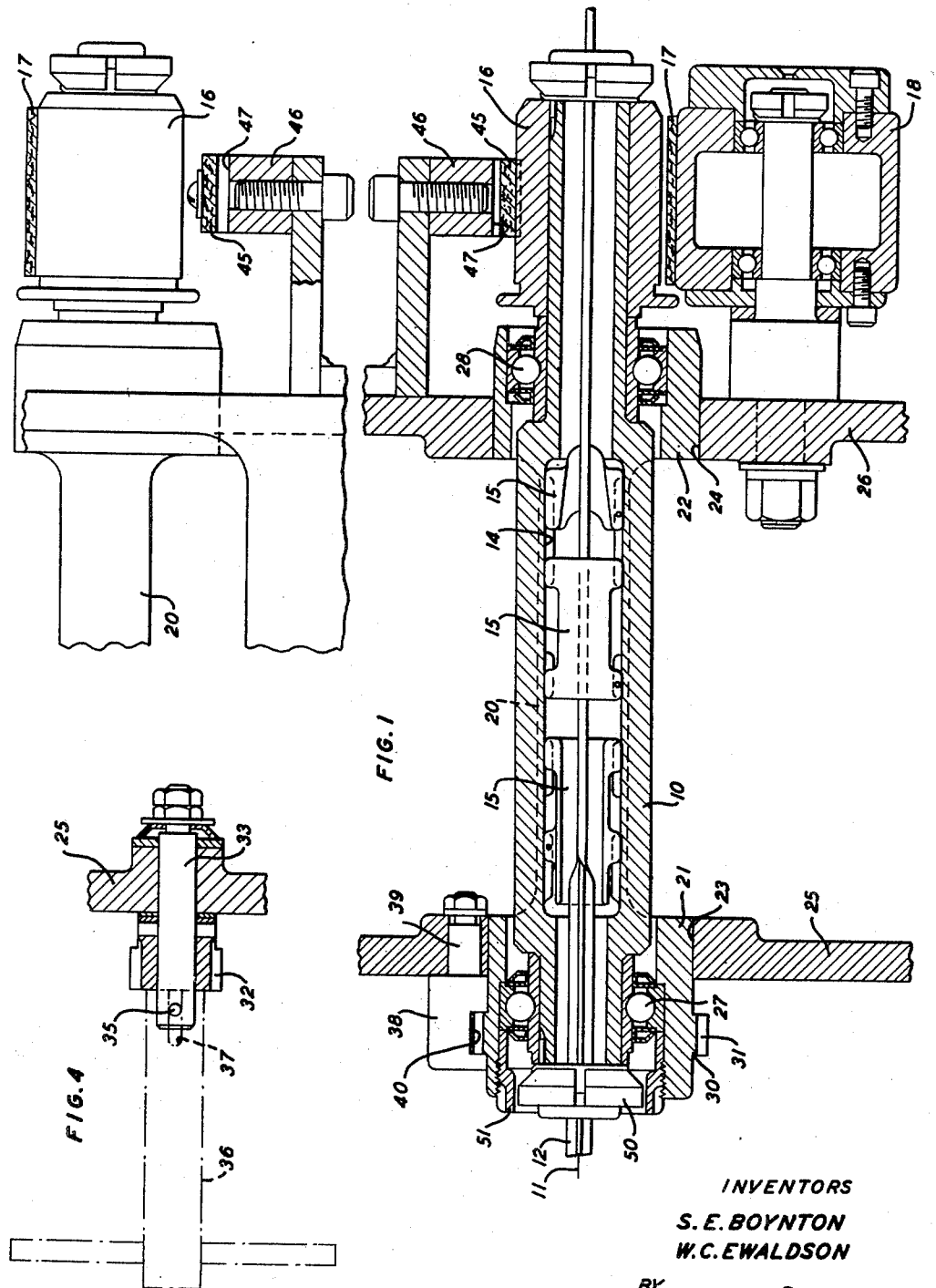

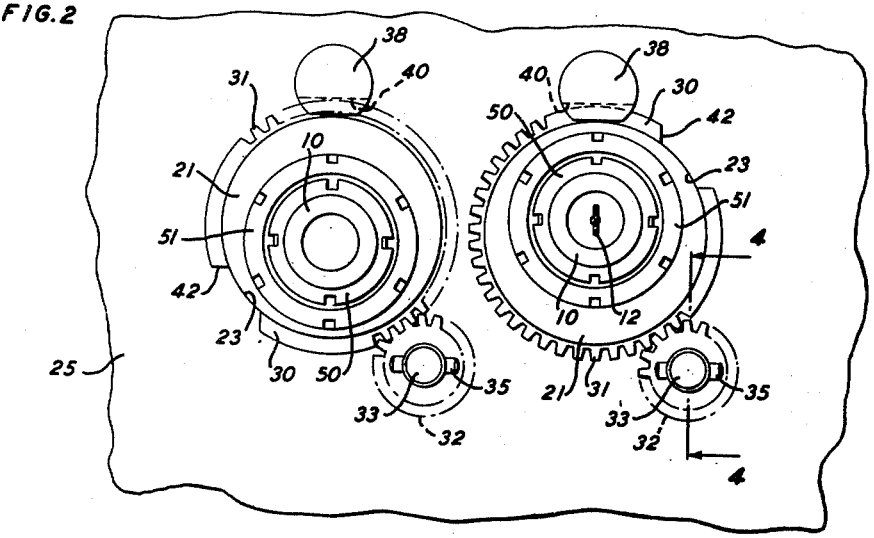
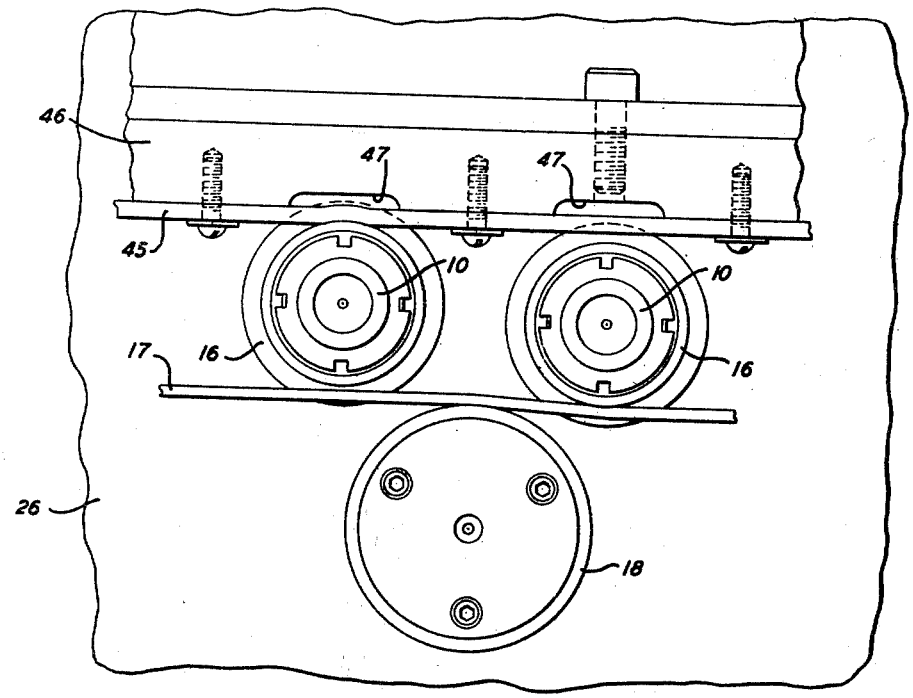

2,517,381

UNITED STATES PATENT OFFICE 2,517,381

MACHINE FOR MAKING INSULATED CONDUCTORS

Stanley E. Boynton, Westfield, and Waldemar C. Ewaldson, Millington, N. J., assignors to Western Electric Company, Incorporated, New York, N. Y., a corporation of New York Application April 16, 1947, Serial No. 741,919

4 Claims. (Cl. 154—2.26)

1

This invention relates to spindle mountings, and more particularly to a spindle mounting which is movable laterally relative to a drive means for the spindle and removable from its support.

In pulp insulating machines where ribbons of pulpous material are initially formed on a multiplicity of electrical conductors during their longitudinal advancement, there are hollow rotating spindles containing forming elements to form the ribbons into circular cross-sectional contours as the conductors travel through the spindles. Heretofore, a preferred form of spindle for supporting the forming elements in a pulp insulating machine as shown in Figs. 10 to 15, inclusive, of the patent to John N. Selvig, 1,753,948, was made a permanent part of the pulp insulating machine, the forming elements thereof, however, being removable. The forming elements become worn and must be replaced at frequent intervals and when a machine is processing thirty to sixty electrical conductors at one time, the daily output of each machine depends greatly on the minimum time loss for maintenance. The spindles, of necessity, must be positioned closely adjacent each other making it difficult for the removal of the forming elements in any of the spindles and the placing of new forming elements therein.

An object of the invention is to provide a mounting for a spindle carrying a driven member, the mounting being movable readily laterally to move the driven member of the spindle into and out of engagement with a drive member therefor, and also being removable readily from a support for the mounting.

In accordance with the invention, a cylindrical housing is disposed in an apertured support and has bearings for the spindle carrying a driven member, to support the spindle with its axis spaced from the centerline of the housing. The housing is provided with means to cause rotation thereof to move the spindle laterally to move the driven member thereof into and out of engagement with a driving member therefor. There is also provided a brake element spaced from the drive member to be engaged by the driven member when the housing is rotated to move the driven member away from the drive member. The means for rotating the housing includes a rotatable pinion positioned to engage a toothed flange which extends partially around the housing, an opening being provided between the ends of the flange. A retaining element mounted on the support straddles the flange to

2 hold the housing with the spindle in place while in operating position, the housing being removable from its support together with the spindle and its driven member by aligning the opening between the ends of the flange with the retaining element, through rotation of the pinion.

Other objects and advantages will be apparent from the following detailed description when considered in conjunction with the accompanying drawings, wherein Fig. 1 is a fragmentary sectional view of a portion of a pulp insulating machine embodying the invention;

Fig. 2 is a fragmentary end elevational view taken from the left of the lower half of Fig. 1;

Fig. 3 is a fragmentary end elevational view taken from the right of the lower half of Fig. 1; and Fig. 4 is a fragmentary sectional view taken along the line 4—4 of Fig. 2 showing also the tool employed to cause rotation of any of the pinions.

In the present embodiment of the invention, the spindle 10 is hollow for the advancement of an electrical conductor 11 with its ribbon 12 of insulating material therethrough. The spindle is open at 14 for a portion of its length, the openings appearing at diametrically opposed positions to removably receive forming elements 15 which serve to wrap the edges of the ribbon 12 about the conductor during rotation of the spindle. A driven member 16 which in the present instance is a pulley is fixedly mounted on the outer end of the spindle 10 to engage a drive member 17 which in the present embodiment is a belt travelling continuously relative to idler rollers 18 to rotate the pulleys of the various spindles.

The mounting for the spindle includes a housing 20 having diametrically open portions, similar to the spindle, between its ends 21 and 22. The housing is cylindrical in cross-sectional contour, particularly at the ends thereof, and is to be rocked about its centerline in aligned apertures 23 and 24 of vertical supports 25 and 26. The longitudinal opening in the housing for the bearing 27, in the end 21, and the bearing 28, in the end 22, is spaced from and parallel with the general centerline of the housing. The spindle 10 supported by the bearings 27 and 28 has its axis eccentric with the axis or centerline of the housing, the purpose being to cause movement of the spindle and the driven member or pulley 16 laterally to move the spindle into and out of engagement with the belt 17 during rocking movement of the housing about its centerline.

A flange 30 extending partially about the end 21 of the housing is provided with teeth 31 to be engaged by the teeth of a pinion 32 fixedly mounted on a stub shaft 33 journaled in the support 25. A pin 35 extending laterally through the end of the stub shaft 33 is to be engaged by a socket wrench 36 slotted at its end 37 to straddle the pin and cause rotation of the pinion 32. A retaining element 38 mounted on the support 25 at 39 adjacent the end 21 of the housing is grooved at 40 to straddle the flange 30 to cooperate with the flange in holding the housing with the spindle in place during operation of the machine. The space 42 between the ends of the flange, when aligned with the retaining element 38, will free the housing for removal from its support, namely the apertures 23 and 24 of the uprights 25 and 26.

To facilitate in the removal of the housing, a brake element 45 extending in a path adjacent the pulleys 16 of a plurality of spindles, but spaced therefrom during normal operation of the spindles, is positioned to be engaged by the pulley of any of the spindles when the housing 20 is rotated to move the pulley of its spindle away from the belt. A holder 46 for the brake element 45, which is a flexible material of the fibrous type employed for this purpose, has recesses 47 adjacent each pulley 16 to allow flexing of the brake element with increased pressure of the pulley thereon to hasten the stopping of the pulley and spindle.

The entire spindle with its pulley may be readily removed from the housing by removing a retaining nut 50 threadedly disposed on the left end of the spindle. When the nut 50 is removed, the entire spindle, the pulley 16 and the bearing 28 may be removed by movement to the right out of the housing. A retaining element 51 threadedly disposed in the end 21 of the housing holds the bearing 27 in place.

During normal operation of the machine, the spindle 10 is supported in its housing in a position as shown at the right in Fig. 3 whereby the pulley 16 engages the belt 17 causing the spindle to rotate during the longitudinal advancement of the insulated conductor therethrough wrapping the ribbon 12 of insulating material about the conductor. If the forming elements 15 become worn, the operator may readily rotate the adjacent pinion 32, by the aid of the crank 36, to rock the housing 20 from the positions shown at the right in Figs. 2 and 3 until the housing with its spindle is in the position shown at the left in Figs. 2 and 3, as well as in the lower portion of Fig. 1. This rocking movement of the housing has caused the spindle with its pulley to move laterally, moving the pulley away from the belt 17 and into engagement with the braking element 45.

Rotation of the spindle is stopped and the operator may then rotate the pinion 32, by the aid of the crank 36 to position the open space of the flange in registration with the retaining element 38, at which time the housing with the spindle and pulley may be removed from the support, that is, from the apertures in the uprights. If desired, another housing with a spindle and forming elements 15 may be immediately inserted in place or the forming elements 15 in the spindle just removed may be taken from the spindle and new forming elements inserted in place, after which this spindle with its housing may be returned to the machine. In either case, the housing with the spindle is moved to the right into the apertures 22 and 23 with the opening 42 in the flange 30 aligning with the retaining element 38, the teeth of the flange at this time registering with the teeth of its pinion 32. The pinion may then be rotated to rock the housing about its centerline causing lateral movement of the spindle until the pulley thereon is moved into engagement with its belt 17. The machine is then in readiness for operation. The retaining element 38 straddling the flange 30 will hold this assembly in place.

Although specific improvements of the invention have been shown and described, it will be understood that they are but illustrative and that various modifications may be made therein without departing from the scope and spirit of this invention as defined by the appended claims.

What is claimed is:

1. A mounting for a spindle having a driven member fixed thereon to engage a drive member to cause rotation of the spindle, the mounting for the spindle comprising a cylindrical housing, a support for the housing apertured to receive the housing and support it for movement about its longitudinal centerline, bearings mounted in the housing at spaced positions to support the spindle longitudinally of the housing with its axis spaced from the centerline of the housing and the driven member thereof externally of the housing adjacent the drive member, means to turn the housing about its centerline to shift the spindle and its driven member laterally to move the driven member into and out of engagement with the drive member, a flange on the housing having an open segment, and a retaining element mounted on the support to be engaged by the flange to maintain the housing in the apertures of the support, until the open segment of the flange is moved by the said turning means for the housing to register with the retaining element to free the housing for removal from the apertures of the support with the spindle and its driven member.

2. A mounting for a spindle having a driven member fixed thereon to engage a drive member to cause rotation of the spindle, the mounting for the spindle comprising a cylindrical housing, a support for the housing apertured to receive the housing and support it for movement about its longitudinal centerline, bearings mounted in the housing at spaced positions to support the spindle longitudinally of the housing with its axis spaced from the centerline of the housing and the driven member thereof externally of the housing adjacent the drive member, a toothed flange extending partially about the housing and fixed thereto with an opening between its ends, a gear rotatably carried by the support to engage the toothed flange and thereby turn the housing about its centerline to shift the spindle and its driven member laterally to move the driven member into and out of engagement with the drive member, and a retaining element mounted on the support to engage the toothed flange to hold the housing in the apertures of the support.

3. A mounting for a spindle having a driven member fixed thereon to engage a drive member to cause rotation of the spindle, the mounting for the spindle comprising a cylindrical housing, a support for the housing apertured to receive the housing and support it for movement about its longitudinal centerline, bearings mounted in the housing at spaced positions to support the spindle longitudinally of the housing with its axis spaced from the centerline of the housing and the driven member thereof externally of the housing adjacent the drive member, a toothed flange extending partially about the housing and fixed thereto with an opening between its ends, a gear rotatably carried by the support to engage the toothed flange and thereby turn the housing about its centerline to shift the spindle and its driven member laterally to move the driven member into and out of engagement with the drive member, and a retaining element mounted on the support to engage the toothed flange to hold the housing in the apertures of the support, the housing being removable from its apertures in the support with the spindle and its driven member by rotation of the gear to align the opening in the toothed flange between the ends thereof with the retaining element.

4. A mounting for a hollow spindle, through which a core with an attached ribbon of pulpous material may be advanced, open laterally for a portion of its length and having members adjacent the open portion to form the material about the core while the spindle is rotated by a drive member when engaged by a driven member mounted on the spindle, the mounting for the spindle comprising a cylindrical housing having an opening intermediate its ends to register with the open portion of the spindle, a support for the housing apertured to receive the ends of the housing and support it for movement about its longitudinal centerline, bearings mounted in the housing at spaced positions to support the spindle longitudinally of the housing with its axis spaced from the centerline of the housing and the driven member thereof externally of the housing adjacent the drive member, and means to turn the housing about its centerline to shift the spindle and its driven member laterally to move the driven member into and out of engagement with the drive member.

STANLEY E. BOYNTON.
WALDEMAR C. EWALDSON.

REFERENCES CITED

The following references are of record in the file of this patent:

UNITED STATES PATENTS

| Number | Name | Date |
|---|---|---|
| 761,959 | Handy | June 7, 1904 |
| 870,997 | Sauer | Nov. 12, 1907 |
| 1,031,396 | Tatman | July 2, 1912 |
| 1,189,336 | Armstrong | July 4, 1916 |

FOREIGN PATENTS

| Number | Country | Date |
|---|---|---|
| 1,540 | Sweden | Jan. 17, 1889 |
| 118,288 | Australia | Mar. 30, 1944 |